United States Patent [19]
Alexandro, Jr. et al.

[11] Patent Number: 5,349,541
[45] Date of Patent: Sep. 20, 1994

[54] METHOD AND APPARATUS UTILIZING NEURAL NETWORKS TO PREDICT A SPECIFIED SIGNAL VALUE WITHIN A MULTI-ELEMENT SYSTEM

[75] Inventors: Frank J. Alexandro, Jr., Kirkland, Wash.; Robert W. Colley, Menlo Park; Ali Ipakchi, San Carlos, both of Calif.; Mostafa Khadem, Los Altos, Calif.

[73] Assignee: Electric Power Research Institute, Inc., Palo Alto, Calif.

[21] Appl. No.: 824,794

[22] Filed: Jan. 23, 1992

[51] Int. Cl.$^5$ .................. G06G 7/48; G06G 7/62
[52] U.S. Cl. .................. 364/578; 364/150; 364/495; 364/550; 364/551.01; 395/21; 395/23; 395/907
[58] Field of Search .............. 364/148, 150, 495, 550, 364/551.01, 578; 395/20–24, 906, 907, 914, 915; 376/214–216

[56] References Cited
U.S. PATENT DOCUMENTS

| | | | |
|---|---|---|---|
| 5,023,045 | 6/1991 | Watanabe et al. | 376/215 |
| 5,122,976 | 6/1992 | Bellows et al. | 364/550 |
| 5,175,797 | 12/1992 | Funabashi et al. | 395/22 |

Primary Examiner—Kevin J. Teska
Assistant Examiner—Jae H. Choi
Attorney, Agent, or Firm—Flehr, Hohbach, Test, Albritton & Herbert

[57] ABSTRACT

A method and apparatus for predicting a signal value for a target element within a multi-element system is disclosed. The method includes modeling the multi-element system by defining fundamental physical relationships between the target element and other elements within the system. The resultant system model is in the form of a set of coupled non-linear differential equations. These differential equations are then approximated into linearized models about an operating point or series of operating points corresponding to the system behavior. The linearized differential equations are then subjected to a coupling analysis. The coupling analysis is employed to determine dynamic coupling between instruments. The coupling analysis assesses the degree of observability of the system and associated elements. The coupling analysis may be based upon observability tests, gramian analyses, or modal analyses. Based upon the coupling analysis, coupled elements are selected. The coupled elements correspond to system elements which are strongly coupled to the target element. A neural network is then trained using previous process values corresponding to the coupled elements. Thereafter, present operating system values corresponding to the coupled elements are fed to the trained neural network. The trained neural network processes the present operating system values to render a predicted value for the target element. This predicted value is then compared to the present system value to determine whether the target element is operating correctly.

6 Claims, 3 Drawing Sheets

METHOD AND APPARATUS UTILIZING NEURAL NETWORKS TO PREDICT A SPECIFIED SIGNAL VALUE WITHIN A MULTI-ELEMENT SYSTEM

BRIEF DESCRIPTION OF THE INVENTION

The present invention relates generally to predicting signal values for individual elements in a multi-element system such as a power plant. More particularly, the present invention relates to a method and apparatus utilizing system modeling, coupled element values within the system, and neural networks for estimating proper signal values in order to identify erroneous signals which may indicate the failure of an element within a multi-element system.

BACKGROUND OF THE INVENTION

Many multi-element systems include a large number of discrete devices which provide monitoring and control functions for their respective systems. For instance, a nuclear power plant depends upon plant instrumentation for accurate reporting of equipment status and thermofluid conditions. In critical multi-element systems, such as nuclear power plants, it is imperative to obtain accurate readings from the elements within the system. Erroneous or contradictory instrument signals may provide the operator or automatic control system with incorrect information which may result in dangerous system operation.

Measurement errors can arise from drift in instrument calibration or from instrument failure. Errors due to calibration drift are not easy to detect because they are generally associated with a gradual degradation of the measurement device.

Instrument calibration typically requires manual intervention, which is a time consuming operation. Within complex multi-element systems, a significant portion of the operation and maintenance budget is consumed by the instrument recalibration activities. Aside from the expense associated with present instrument calibration techniques, the manual nature of the operation is susceptible to the introduction of errors.

In many complex multi-element systems, such as nuclear power plants, those measurements which are critical to safety are subject to hardware redundant measurements. In other words, a number of redundant instruments are used to measure the same value. Signal validation techniques are then used to determine the most accurate reading from the acquired redundant data. Many of these techniques rely upon software to determine the most accurate value. They are also capable of detecting a failure or a significant drift.

Not all system measurements justify redundant instruments. Therefore, many parameters have a single instrument. As a result, periodic calibration testing is currently the only means for detecting failures and instrument drifts on non-redundant instruments.

In contrast to the single instrument and redundant instrument techniques described, mathematical redundancy techniques may also be employed. Mathematical redundancy methods can be subdivided into analytical methods and statistical methods.

In the analytical redundancy method, a computer model is used to represent the relationship between a target instrument reading, readings from other instruments, a set of model inputs, and an output. For instance, in a nuclear power plant, the reactor core exit temperature can be described as a function of primary coolant flowrate, reactor power, inlet core temperature, primary coolant pressure, and a heat transfer function. Once these interrelationships are defined, a reference value for core exit temperature can be computed from the other variable measurements.

In the analytical redundancy technique, the model is installed on a computer, the model is then fed current input readings, and then the computer calculates an estimated value of the target instrument reading given the current system operating conditions. The current reading of the target instrument is then compared against its estimated value. Any deviations between the estimated value and the actual instrument value are analyzed for detecting calibration drifts or instrument failures.

In theory, the analytical redundancy method is highly effective. However, in practice the method has been impractical to execute. One problem associated with this technique is that the system model in many multi-element systems is extremely complicated. As a result, it is difficult to provide real-time processing of the information relating to the dissimilar instruments. Real-time predictions of element values are necessary for the analytical redundancy paradigm to be practical.

Another problem with the analytical redundancy method is generating an accurate model. The actual behavior of a non-linear system is not easy to reproduce. Prior art attempts to obtain accurate models for multi-element systems have been hindered by the complicated model and the expense of generating the model.

For the analytical redundancy method to become a practical tool, it is necessary to reduce the modelling and the processing time. In this regard, it would be helpful to automatically create the system model. Processing time may also be reduced by providing a method and apparatus for rapidly processing the system model data.

The automatic creation of the system model or rapid processing of the model data must operate within a number of constraints. First, the value of the target instrument should be "observable" from the input from the other instruments which are used to predict the target instrument value. In other words, an "observable" target instrument is an instrument whose output can be predicted from its coupling to other instruments in the system, where the coupling is established through the dynamics of the system.

In an observable system, the model inputs should collectively represent all the process parameters required to compute the output signal. In addition, the model should accurately represent the input-output relationship under various system conditions. The model should also account for any significant process dynamics. Finally, techniques should be available to parameterize the model to actual process conditions. This is necessary because plant equipment may not be operating at designed characteristics due to aging or other process conditions. The concept of observability is fully defined in linear dynamic system literature such as Takahashi, et al., Controls & Dynamic Systems, Addison-Wesley Publishing Co. (1970).

In contrast to the analytical redundancy method, statistical methods may be used to develop an input-output model using time history data. The advantage of the statistical method is that no mathematical description of the process is needed and the implementation is relatively simple. The disadvantage is that it is based on a "curve fit" to process data, and depending on the conditions under which these data are collected, and the selection of the input variables, they may not accurately represent all of the modeled process characteristics. In addition, most statistical techniques ignore dynamic relations between input and output, and are basically steady state models.

U.S. Pat. No. 5,023,045 discloses a plant malfunction diagnostic method which employs statistical methods. In particular, the '045 patent discloses a method of diagnosing the cause of a malfunction in a power plant. Once a malfunction is diagnosed, data relating to the conditions of the plant at the time of the malfunction are fed to a neural network to obtain an assessment of the cause of the malfunction. The neural network is trained on large sets of statistical data. As will be more fully demonstrated below, the '045 patent departs from the present invention in a number of respects. First, the disclosure relies upon statistical methods. In contrast, the present invention relies upon system modelling and analytical redundancy. The '045 patent includes a neural network which is trained on large sets of statistical data, as opposed to the reduced training set used with the present invention. The '045 patent endeavors to provide a solution to a system problem. In contrast, the present invention identifies a potential system problem. The present invention focuses upon testing individual component performance, as opposed to monitoring overall system performance.

Neural networks, as those disclosed in the '045 patent, emulate the ability of the human brain to identify patterns by simulating the operation of human nerve cells, called neurons. Artificial neural systems are networks of interconnected processing elements, or neurons. Each neuron can have multiple input signals, but generates only one output signal.

Neural networks typically include a number of layers. The first layer, the input layer, receives the input data, operates on it, and communicates the results to a hidden layer. After processing through one or more hidden layers, the signal is conveyed to the output layer. Each layer includes a group of neurons operating in parallel on the signals fed to the layer. The neurons in each group of neurons in a layer act as feature detectors. For instance, a group of neurons may act to identify conditions which result in excessive pressure in a pipe.

The feature detector function is realized through multiplying the input signal by a plurality of weight factors. The product is then summed by a summing network which applies its output through a function to generate the output of the neuron. The output of each neuron is therefore dependent upon the inputs applied to the neuron, the activation function, and the neuron's associated input signal weighting.

The weighting of the neuron inputs may be calculated so as to render the neuron sensitive to relationships between elements. A layer may have many groups of neurons which are processing different information in parallel. As will be demonstrated below, this neuron behavior can be used to simulate systems described by first-order ordinary differential equations by incorporating present and past system values.

By adjusting the weighting associated with the neurons, the network can become adaptive. That is, by readjusting the weights on the connections between the neurons in such a way that they generate a desired output for a given input, they can be used to provide an identifying output signal based upon the unknown input signal they receive. Thus, different system characteristics may be recognized by adapting the neural network to perform different logic functions and thereby respond to significant features which characterize a given operating condition of a system.

In order to make neural networks a feasible tool in recognition of failed elements within a system, the training of the neural networks should be based on causal relationships between the inputs and outputs for the operating conditions of the system. By relying upon causal relationships between the inputs and outputs, the neural networks are able to converge upon a solution. In contrast, with statistical methods, it is difficult for the neural networks to converge upon a solution. Moreover, even if convergence is obtained, there is some question as to causality since statistical methods are relied upon, as opposed to relationships between inputs and outputs.

OBJECTS AND SUMMARY OF THE INVENTION

It is a general object of the present invention to provide a method and apparatus for accurately estimating signals in a multi-element system in order to identify erroneous signals which may indicate the failure of an element within the system.

It is a related object of the present invention to provide a relatively inexpensive and expedient method and apparatus for monitoring the calibration of instruments within a multi-instrument system without manual intervention.

It is another object of the present invention to provide a relatively inexpensive and expedient method and apparatus for identifying failed instruments within a multi-instrument system.

It is still another object of the present invention to provide a method and apparatus for creating a simplified system model to be used within an analytically redundant process.

It is yet another object of the present invention to provide an analytically redundant process with reduced processing time through the use of neural networks.

It is a related object of the present invention to utilize neural networks for processing analytically redundant information.

It is a more particular object of the present invention to rely upon causal relationships between elements so as to reduce the neural network training set so that the neural network may be trained in an expeditious manner.

These and other objects are achieved by a method and apparatus for predicting a signal value for a target element within a multi-element system. The invention does not rely upon statistical techniques, rather the invention employs analytical redundancy techniques. The method of the present invention includes modeling the multi-element system by defining fundamental physical relationships between the target element and other elements within the system. The resultant system model is in the form of a set of coupled non-linear differential equations. These differential equations are then approximated into linearized models about an operating point or series of operating points corresponding to the system behavior. The linearized differential equations are then subjected to a coupling analysis. The coupling analysis is employed to determine dynamic coupling between instruments. The coupling analysis assesses the degree of observability of the system and associated elements. The coupling analysis may be based upon observability tests, gramian analyses, or modal analyses. Based upon the coupling analysis, coupled elements are selected. The coupled elements correspond to system elements which are strongly coupled to the target element. A neural network is then trained using previous process values corresponding to the coupled elements. Thereafter, present operating system values corresponding to the coupled elements are fed to the trained neural network. The trained neural network processes the present operating system values to render a predicted value for the target element. This predicted value is then compared to the present system value to determine whether the target element is operating correctly.

BRIEF DESCRIPTION OF THE DRAWINGS

For a better understanding of the nature and objects of the invention, reference should be had to the following detailed description taken in conjunction with the accompanying drawings, in which.

Like reference numerals refer to corresponding parts throughout the several views of the drawings.

DETAILED DESCRIPTION OF THE INVENTION

Figure 1:
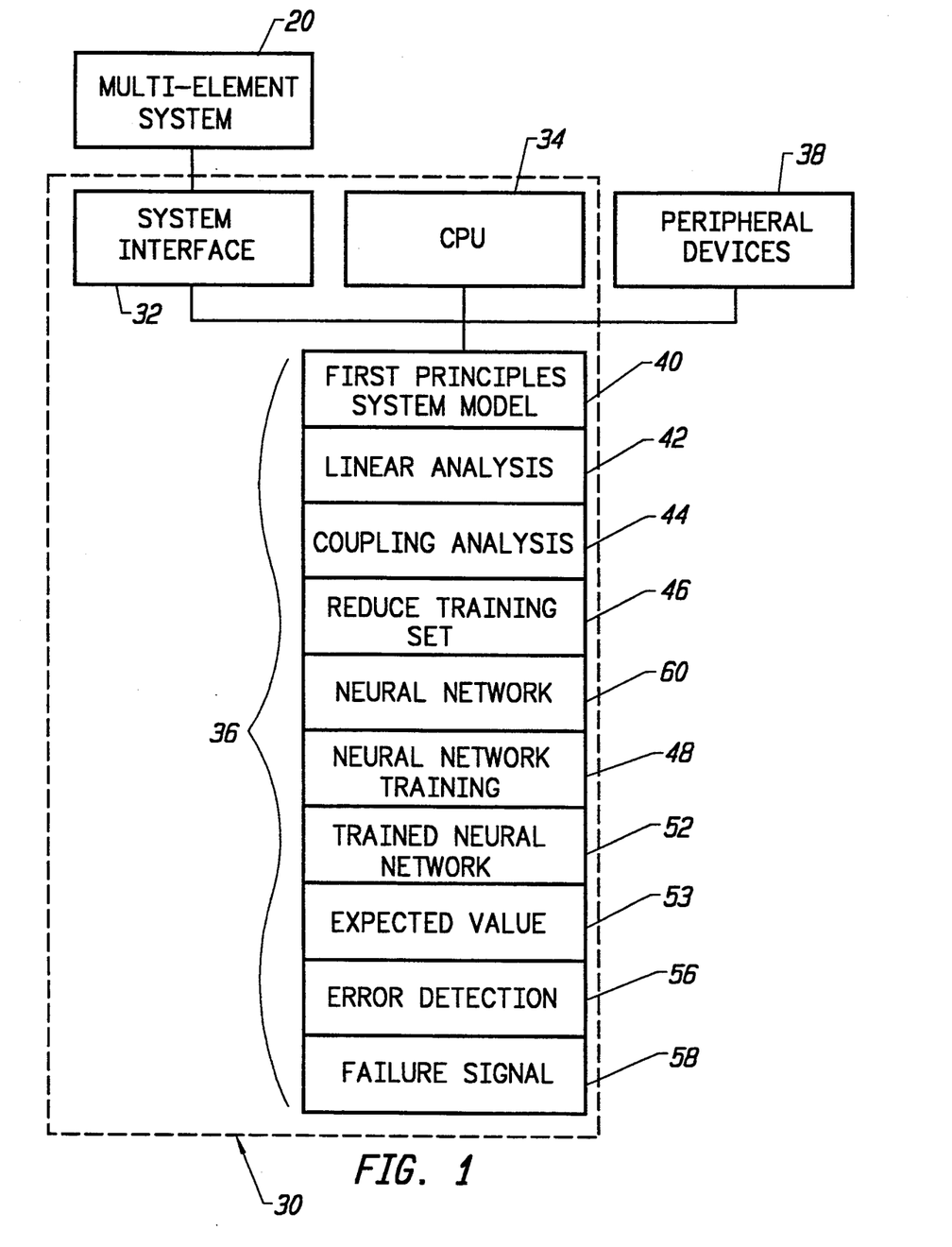
FIG. 1 is a block diagram of a multi-element system coupled to a general purpose computer which is programmed to operate in accordance with the present invention.

Referring to FIG. 1, a simplified depiction of a multi-element system 20 is provided. The multi-element system may range in complexity from a nuclear power plant to a simple electrical circuit. The present invention is applicable to any multi-element system wherein individual elements of the system may be expressed as a function of other elements in the system. Thus, nuclear power plants, fossil-fueled power plants, industrial manufacturing, and other process plants are some examples for which this invention would have applications in signal validation, instrument calibration, equipment fault detection, and process control.

The multi-element system 20 is coupled to a computer 30. The computer 30 includes a system interface 32 for receiving the signals from the multi-element system. Computer 30 also includes a central processing unit (CPU) 34 and memory 36, which may be in the form of ROM, RAM, and disk memory. Memory 36 stores a number of control programs which operate in conjunction with CPU 34, as will be more fully described herein. Computer 30 is also coupled to peripheral devices 38, such as a keyboard, mouse, monitor, and printer.

Figure 2:
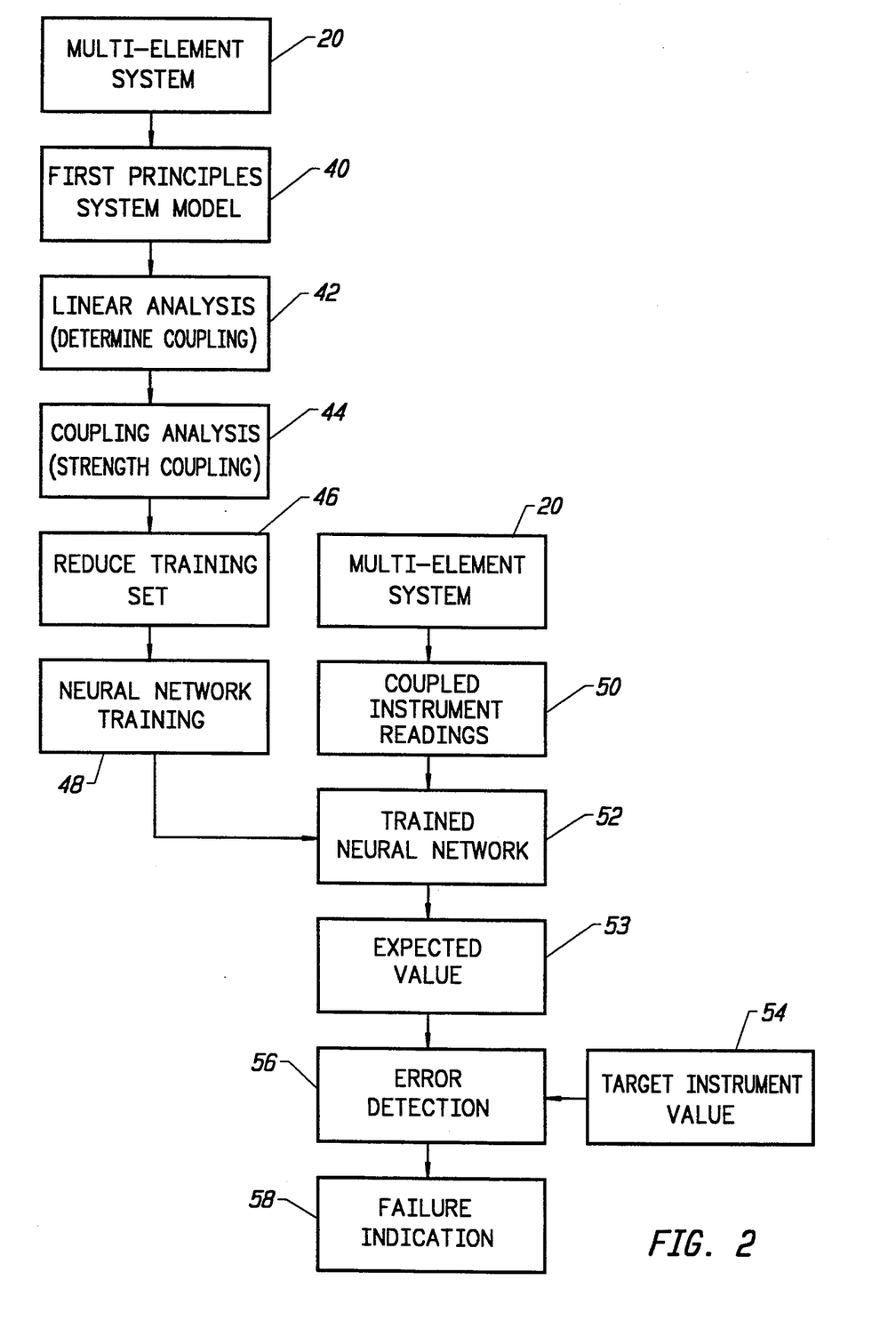
FIG. 2 is a flow diagram depicting the primary steps associated with the present invention, as executed on the general purpose computer in FIG. 1.

Turning to FIG. 2, the sequence of operations associated with the present invention are depicted in a flow chart. Multi-element system 20 is reduced to a mathematical model describing the interrelationships between the different elements in the system (block 40). In other words, first principles of physics, also referred to as the laws of physics, are used to describe the physical relationships between the different elements in the system.

The resultant system model is expressed in the form of coupled non-linear differential equations. The next step associated with the present invention is to transform the non-linear model of the system into a linear model (block 42). In other words, a linear approximation is generated for the non-linear differential equations.

The next step associated with the invention is to execute a coupling analysis of the linear equations (block 44). The coupling analysis provides information on the strength of the coupling between individual elements within the system. The coupling analysis may be in the form of an observability test, a gramian analysis, or a modal analysis.

Based upon the information relating to the strength of the coupling between the elements of the system, a reduced training set may be selected (block 46) for execution on a neural network. That is, in accordance with the invention, a system model has been created and simplified by determining the strength of the couplings between the instruments within the system. By considering only those instruments with relatively strong couplings, processing time for problems may be reduced. More particularly, by reducing the training set for the neural networks, the neural networks may be expeditiously trained on the most relevant data.

Neural network training (block 48) is realized by using previous system process data corresponding to those elements with strong couplings. In other words, the neural network input signals will be derived from a number of elements within a system which are strongly coupled to the target element. During training, the neuron weights are adjusted until the output of the neural network matches the training element value. For instance, the flow rate through a pipe may be determined if information is known such as the cross-sectional area of the pipe, the temperature within the pipe, and the pressure within the pipe. Therefore, temperature, pressure, and other previous process information would be fed to the neural network. The neural network would then be trained until its output converged on the actual flow rate demonstrated from the process data corresponding to the system.

After the neural network is trained, the trained neural network may be used for identifying failed or failing elements within the system 20. As depicted in FIG. 2, coupled instrument readings (block 50) from the system are fed to the trained neural network (block 52). In other words, present operating values for the coupled elements are fed to the trained neural network. The trained neural network then produces a value (block 53) corresponding to the appropriate or expected value for the instrument under consideration. This expected value is compared to the actual value of the target instrument under consideration (block 54) to detect an error (block 56). If the expected value and the actual value are not within a preselected range, a failure signal (block 58) is provided to a peripheral device 38.

Relying upon the example provided above, operating information such as temperature, pressure, and cross-sectional area of a pipe is conveyed to the trained neural network. The neural network then renders a value for the flow rate within the pipe. This flowrate is compared to the target instrument's reading of the actual flow rate within the pipe. If the two values do not correspond, then an error indication is provided.

Thus, it can be appreciated that the trained neural network 50 is capable of predicting proper values for an element within a system based upon operating information relating to coupled elements within the system.

Without reducing the training set for the neural network, as done in accordance with the present invention, it would be difficult for the neural network to converge to a proper solution from the large amount of input data associated with a complicated multi-element system.

One skilled in the art will recognize a number of advantages associated with the present invention. First, the invention provides a relatively inexpensive and expedient way of identifying failed or drifting instruments without the necessity of manual intervention. The invention is fully applicable to single instrument calibration. The invention avoids statistical methods and relies upon more dependable definitions of physical relationships between elements within a system. The invention provides means for simplifying the system model in a reliable fashion. The simplified model enables the use of neural networks because the reduced amount of information to be processed allows the neural networks to converge to a solution.

Figure 3:
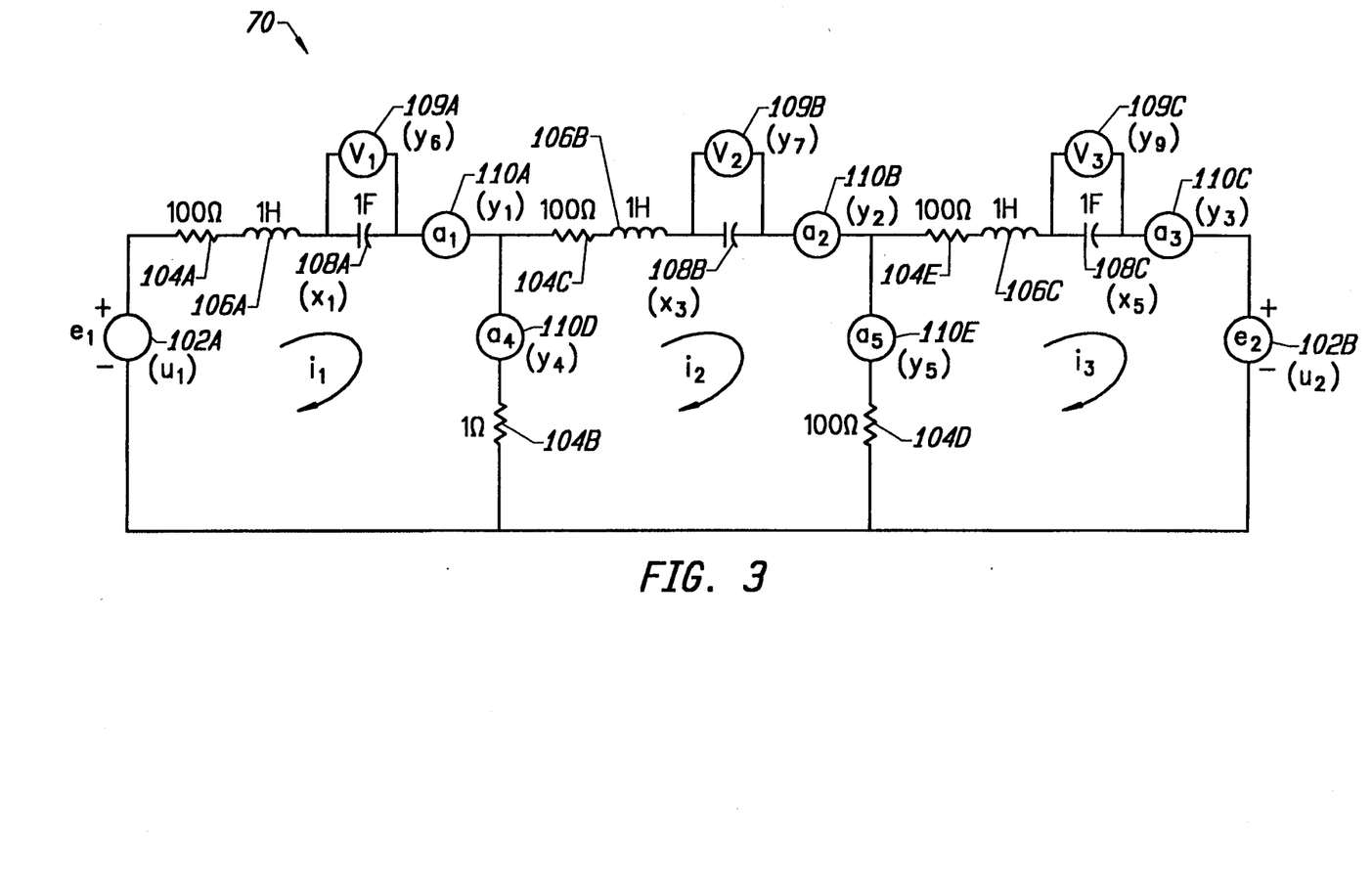
FIG. 3 is a circuit diagram which is used as a simplified model in demonstrating the present invention.

Other advantages associated with the invention will be recognized through the following description of a simple multi-element system which is analyzed in accordance with the present invention. Turning to FIG. 3, a first principles system model is depicted which corresponds to a physical mesh circuit. The actual physical circuit is represented as a multi-element system 20 with various elements including voltage sources 102, resistors 104, inductors 106, capacitors 108, volt meters 109, and ammeters 110. The model circuit of FIG. 3 represents a multi-element system of non-linear elements. In the system 20 of FIG. 3, $e_1$ and $e_2$ are the applied voltage sources, $i_1$, $i_2$, $i_3$, are mesh currents as shown in the figure, $a_1$, $a_2$, $a_3$, $a_4$, $a_5$ are ammeters and $v_1$, $v_2$, and $v_3$ are voltmeters measuring the instantaneous values of the voltages across the capacitors.

The non-linear multi-element system of FIG. 3 may be defined as a linear system through the properties of fundamental physics (block 40). In particular, first, second and third equations may be defined relating the applied voltages to the mesh currents:

$$e_1 = \frac{di_1}{dt} + 101 i_1 + \int i_1 dt - i_2$$

$$0 = -i_1 + \frac{di_2}{dt} + 201 i_2 + \int i_2 dt - 100 i_3$$

$$-e_2 = -100 i_2 + \frac{di_3}{dt} + 200 i_3 + \int i_3 dt$$

Thus, the non-linear elements of the multi-element system have been replaced by their linear approximations (block 42). Such a linear analysis of non-linear elements is known in the art. The linear analysis is performed to determine the extent to which a functional relationship may exist between a target instrument, whose output is to be verified, and a reference set of dissimilar instruments.

The next step associated with the present invention is to perform a coupling analysis (block 44). As previously stated, the coupling analysis may be in the form of an observability test, a gramian analysis, or a modal analysis. By way of example, a modal analysis of the linear system will be provided herein.

As indicated by the parenthetical designations in FIG. 3, different elements of the multi-element system may be identified by letting:

$x_1 = \int i_1 dt$
$x_2 = i_1$
$x_3 = \int i_2 dt$
$x_4 = i_2$
$x_5 = \int i_3 dt$
$x_6 = i_3$
$u_1 = e_1$
$u_2 = e_2$
$y_1 = a_1$
$y_2 = a_2$
$y_3 = a_3$
$y_4 = a_4$
$y_5 = a_5$
$y_6 = v_1$
$y_7 = v_2$
$y_8 = v_3$ Using these definitions of new variables, it is seen that by taking derivatives (identified by "$\dot{x}$") of the above values, that $\dot{x}_1 = x_2$
$\dot{x}_3 = x_4$
$\dot{x}_5 = x_6$ Inserting the new definitions of variables into the first, second and third differential equations defined above, the following three equations are obtained:

$e_1 = \dot{x}_2 + 101 x_2 + x_1 - x_4$ $0 = -x_2 + \dot{x}_4 + 201 x_4 + x_3 - 100 x_6$ $-e_2 = -100 x_4 + \dot{x}_6 + 200 x_6 + x_5$ Rearranging the previous six equations gives $\dot{x}_1 = x_2$ $\dot{x}_2 = -x_1 - 101 x_2 + x_4 + u_1$ $\dot{x}_3 = x_4$ $\dot{x}_4 = x_2 - x_3 - 201 x_4 + 100 x_6$ $x_5 = x_6$ $\dot{x}_6 = 100 x_4 - x_5 - 200 x_6 - u_2$ The voltage and current measurement expressed by $y_1$ through $y_8$ can be expressed in terms of $x_1$ through $x_6$ by the equations:

$y_1 = x_2$ $y_2 = x_4$ $y_3 = x_6$ $y_4 = x_2 - x_4$ $y_5 = x_4 - x_6$ $y_6 = x_1$ $y_7 = x_3$ $y_8 = x_5$

These equations can be expressed in matrix form as
$\dot{x} = Ax + Bu$
$y = Cx$
where:

$$A = \begin{bmatrix} 0 & 1 & 0 & 0 & 0 & 0 \\ -1 & -101 & 0 & 1 & 0 & 0 \\ 0 & 0 & 0 & 1 & 0 & 0 \\ 0 & 1 & -1 & -201 & 0 & 100 \\ 0 & 0 & 0 & 0 & 0 & 1 \\ 0 & 0 & 0 & 100 & -1 & -200 \end{bmatrix}$$

$$B = \begin{bmatrix} 0 & 0 \\ 1 & 0 \\ 0 & 0 \\ 0 & 0 \\ 0 & 0 \\ 0 & -1 \end{bmatrix}$$

$$C = \begin{bmatrix} 0 & 1 & 0 & 0 & 0 & 0 \\ 0 & 0 & 0 & 1 & 0 & 0 \\ 0 & 0 & 0 & 0 & 0 & 1 \\ 0 & 1 & 0 & -1 & 0 & 0 \\ 0 & 0 & 0 & 1 & 0 & -1 \\ 1 & 0 & 0 & 0 & 0 & 0 \\ 0 & 0 & 1 & 0 & 0 & 0 \\ 0 & 0 & 0 & 0 & 1 & 0 \end{bmatrix}$$

The foregoing steps have converted the system equations to state variable form. Now, to examine the coupling between instruments, the transformation $x = Vz$ is made. To facilitate the examination, the matrix V is chosen to be a matrix, whose columns are eigenvectors corresponding to the eigenvalues of the matrix A. Thus, V is given by:

$$\begin{bmatrix} -1.1824e-05 & 8.0449e-03 & -5.7738e-03 & -3.5532e-03 & 5.7732e-01 & 8.1645e-01 \\ 3.5532e-03 & -8.1645e-01 & 5.7732e-01 & 1.1824e-05 & -5.7738e-03 & -8.0449e-03 \\ 2.3590e-03 & -3.9921e-03 & -5.7738e-03 & 7.0887e-01 & 5.7732e-01 & -4.0515e-01 \\ -7.0887e-01 & 4.0515e-01 & 5.7732e-01 & -2.3590e-03 & -5.7738e-03 & 3.9921e-03 \\ -2.3471e-03 & -4.0528e-03 & -5.7738e-03 & -7.0532e-01 & 5.7732e-01 & -4.1130e-01 \\ 7.0532e-01 & 4.1130e-01 & 5.7732e-01 & 2.2471e-03 & -5.7738e-03 & 4.0528e-03 \end{bmatrix}$$

and the inverse of V is:

$$\begin{bmatrix} 1.1824e-05 & 3.5533e-03 & -2.3590e-03 & -7.0889e-01 & 2.3472e-03 & 7.0534e-01 \\ -8.0465e-03 & -8.1661e-01 & 3.9929e-03 & 4.0523e-01 & 4.0536e-03 & 4.1138e-01 \\ 5.7749e-03 & 5.7744e-01 & 5.7749e-03 & 5.7744e-01 & 5.7749e-03 & 5.7744e-01 \\ -3.5533e-03 & -1.1824e-05 & 7.0889e-01 & 2.3590e-03 & -7.0534e-01 & -2.3472e-03 \\ 5.7744e-01 & 5.7749e-03 & 5.7744e-01 & 5.7749e-03 & 5.7744e-01 & 5.7749e-03 \\ 8.1661e-01 & 8.0465e-03 & -4.0523e-01 & -3.9929e-03 & -4.1138e-01 & -4.0536e-03 \end{bmatrix}$$

With this transformation, the state equations become:

$$\dot{z} = AA\, z + BB\, u$$

$$y = CC\, z$$

where:

$$AA = \begin{bmatrix} -3.0050e+02 & 0 & 0 & 0 & 0 & 0 \\ 0 & -1.0149e+02 & 0 & 0 & 0 & 0 \\ 0 & 0 & -9.9990e+01 & 0 & 0 & 0 \\ 0 & 0 & 0 & -3.3278e-03 & 0 & 0 \\ 0 & 0 & 0 & 0 & -1.0001e-2 & 0 \\ 0 & 0 & 0 & 0 & 0 & -9.8535e-03 \end{bmatrix}$$

$$BB = \begin{bmatrix} 3.5533e-03 & -7.0534e-01 \\ -8.1661e-01 & -4.1138e-01 \\ 5.7744e-01 & -5.7744e-01 \\ -1.1824e-05 & 2.3472e-03 \\ 5.7749e-03 & -5.7749e-03 \\ 8.0465e-03 & 4.0536e-03 \end{bmatrix}$$

-continued
$$CC = \begin{bmatrix} 3.5532e-03 & -8.1645e-01 & 5.7732e-01 & 1.1824e-05 & -5.7738e-03 & -8.0449e-03 \\ -7.0887e-01 & 4.0515e-01 & 5.7732e-01 & -2.3590e-03 & -5.7738e-03 & 3.9921e-03 \\ 7.0532e-01 & 4.1130e-01 & 5.7732e-01 & 2.3471e-03 & -5.7738e-03 & 4.0528e-03 \\ 7.1243e-01 & -1.2216e+00 & -3.1974e-14 & 2.3708e-03 & 1.5118e-13 & -1.2037e-02 \\ -1.4142e+00 & -6.1540e-03 & 4.4409e-16 & -4.7061e-03 & 8.6042e-16 & -6.0639e-05 \\ -1.1824e-05 & 8.0449e-03 & -5.7738e-03 & -3.5532e-03 & 5.7732e-01 & 8.1645e-01 \\ 2.3590e-03 & -3.9921e-03 & -5.7738e-03 & 7.0887e-01 & 5.7732e-01 & -4.0515e-01 \\ -2.3471e-03 & -4.0528e-03 & -5.7738e-03 & -7.0532e-01 & 5.7732e-01 & -4.1130e-01 \end{bmatrix}$$

The foregoing steps have converted the system equations to modal form using eigenvalues and eigenvectors. The rows of CC indicate which instruments are responding to which modes. A zero (or a very small number relative to the other elements in the same row) in the $i^{th}$ row, $j^{th}$ column indicates that the $i^{th}$ instrument is not responding to the $j^{th}$ mode. To establish which instruments are related, a normalization procedure may be carried out. Each element in a row is divided by the magnitude of the element in that row having the maximum magnitude. Then to facilitate examination of the resulting matrix, all elements below a certain threshold value are set equal to zero. When this procedure is applied to the matrix CC using a threshold value 0.01, the matrix CCF shown below is obtained.

$$CCF = \begin{bmatrix} 0 & -1.0000e+00 & 7.0711e-01 & 0 & 0 & 0 \\ -1.0000e+00 & 5.7154e-01 & 8.1442e-01 & 0 & 0 & 0 \\ 1.0000e+00 & 5.8314e-01 & 8.1852e-01 & 0 & 0 & 0 \\ 5.8319e-01 & -1.0000e+00 & 0 & 0 & 0 & 0 \\ -1.0000e+00 & 0 & 0 & 0 & 0 & 0 \\ 0 & 0 & 0 & 0 & 7.0711e-01 & 1.0000e+00 \\ 0 & 0 & 0 & 1.000e+00 & 8.1442e-01 & -5.7154e-01 \\ 0 & 0 & 0 & -1.000e+00 & 8.1852e-01 & -5.8314e-01 \end{bmatrix}$$

Note that each row of the CCF matrix corresponds to a particular instrument, rows 1 through 8 correspond to instruments $y_1$ through $y_8$. If a particular instrument reading is to be estimated by another set of instruments, then at least one member of the other set should have a nonzero entry in every column that the instrument to be estimated has a nonzero entry. For example, examining CCF it is seen that row 1 (corresponding to instrument $y_1$) has a nonzero entry only in columns two and three. Rows 2 and 3 (corresponding to instruments $y_2$ and $y_3$) also have nonzero entries in columns 2 and 3; hence the readings of $y_2$ and $y_3$ may be used as inputs to a neural net to predict the reading of instrument $y_1$. On the other hand, instruments $y_6$, $y_7$, and $y_8$ have zero entries in columns 2 and 3. Therefore, using these instruments as inputs to a neural net intended to predict the reading of instrument $y_1$ would produce relatively poor results. Using similar reasoning, it can be expected that instruments $y_7$ and $y_8$ would be effective in predicting the reading of instrument $y_6$ because the fifth and sixth columns for each instrument has a nonzero entry, whereas the use of instruments $y_1$, $y_2$, $y_3$, $y_4$, and $y_5$ would not be effective since the fourth, fifth, and sixth columns for these instruments has a zero entry. Using this methodology, the training set for the neural networks may be reduced (block 46).

Having described the techniques used to obtain the reduced training set to be used by the neural network, attention now turns to the neural networks utilized in accordance with the present invention. Many parameters are associated with defining neural networks. These parameters include the number of nodes, the number of hidden layers, and the number of connections. In training, the magnitude of the learning coefficient, the magnitude of the momentum rate, and the number of training samples are important factors.

Preferably, fully-connected feed-forward neural networks are used in accordance with the present invention. A feed-forward neural network consists of three or more layers of processing units: one input layer, one or more hidden layers, and one output layer.

A network with one hidden layer comprised of five to ten nodes is a useful classifier. Using fewer nodes seems to prolong training, while using more nodes seems to produce degraded performance on the testing samples. Presumably, this is because with too many degrees of freedom, the network starts to memorize the particular input, instead of being forced to generalize.

A learning coefficient of less than 1.0 and a momentum factor of 0.9 or less may be used. The following is an example of a logistic activation function which may be employed:

$$f(x) = 1/(1 + e^{(-1x)}).$$

Neural network training (block 48) is an off line procedure. It is only required when a new system is being analyzed, or when re-training with new data is required to improve the system after sustained operation.

Related instrument values are fed to the neural network and the network's output is compared to the target instrument value. If the output is incorrect, the weighting factors on the connections between processing units are adjusted until the network converges to the known process value. A suitable training technique is the "backpropagation" algorithm which is described in "Parallel Distributed Processing" by Rumelhart and McClelland (The MIT Press, 1986). A "Backpropagation Through Time" method may also be used. This technique is described in, Verbos, "Backpropagation Through Time; What it Does and How to do it", IEEE 78, 10 (October 1990).

Suitable neural network simulators which may be used in accordance with the present invention are OWL, NEUROSOFT, and BRAINMAKER.

NEUROSOFT is a commercially available product sold by HNC, Inc., San Diego, Calif. OWL is a commercially available product sold by Olmsted and Watkins, Escondido, Calif. Simulations may be run on a Sun 3/50 computer workstation running a Unix operating system.

As previously discussed, after the neural network is trained, actual instrument readings may be fed to the network to generate expected values for the target instrument signal. A simple error detection module (block 56) may be employed to recognize any significant deviation between the expected value and the actual value. For instance, any deviation of over 2% from the expected value may generate a failure signal which may be displayed on a peripheral device 38, such as a monitor or printer. A human operator may then take appropriate actions to fix the drifting or failed instrument.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

We claim:

1. An apparatus for predicting a signal value for a target element within a multi-element system, said apparatus comprising:
   a storage device containing a system model defining fundamental physical relationships between said target element and said multi-element system, said fundamental physical relationships of said system model being defined in accordance with the laws of physics;
   a processor interpreting said system model to identify a reduced data set of coupled elements within said system model, said reduced data set of coupled elements corresponding to elements within said multi-element system which are coupled to said target element;
   a neural network trained with process values corresponding to said reduced data set of coupled elements, said neural network processing measured system values corresponding to said reduced data set of coupled elements to render a predicted value for said target element;
   means for comparing said predicted value from said neural network to a measured value for said target element to determine whether said target element is malfunctioning; and
   an indicator responsive to said comparing means to identify when said target element is malfunctioning.

2. The apparatus of claim 1 wherein said processor includes
   means for linearizing said system model by defining a plurality of differential equations characterizing said system model; and
   means for executing a coupling analysis on said differential equations to form a matrix.

3. The apparatus of claim 2 wherein said executing means performs a modal analysis.

4. A method for predicting a signal value for a target element within a multi-element system, said method comprising the steps of:
   storing in a memory a system model defining fundamental physical relationships between said target element and said multi-element system, said fundamental physical relationships of said system model being defined in accordance with the laws of physics;
   interpreting said system model with a processor to identify a reduced data set of coupled elements within said system mode, said reduced data set of coupled elements corresponding to elements within said multi-element system which are coupled to said target element;
   training a neural network with process values corresponding to said reduced data set of coupled elements;
   utilizing said neural network to process measured system values corresponding to said reduced data set of coupled elements to render a predicted value for said target element;
   comparing said predicted value from said neural network to a measured value for said target element to determine whether said target element is malfunctioning; and
   actuating an indicator responsive to said comparing step to identify when said target element is malfunctioning.

5. The method of claim 4 wherein said interpreting step includes the steps of:
   linearizing said system model by defining a plurality of differential equations characterizing said system model; and
   executing a coupling analysis on said differential equations to form a matrix.

6. The method of claim 5 wherein said executing step includes a modal analysis.

* * * * *